US009836912B2

(12) United States Patent
Bennett et al.

(10) Patent No.: US 9,836,912 B2
(45) Date of Patent: Dec. 5, 2017

(54) GAMING SYSTEM AND A METHOD OF GAMING

(71) Applicant: Aristocrat Technologies Australia Pty Limited, North Ryde (AU)

(72) Inventors: Nicholas Luke Bennett, Manly Vale (AU); David Villa, Cronulla (AU); Natalie Bryant, Cherrybrook (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

(21) Appl. No.: 13/944,429

(22) Filed: Jul. 17, 2013

(65) Prior Publication Data

US 2014/0031111 A1 Jan. 30, 2014

(30) Foreign Application Priority Data

Jul. 27, 2012 (AU) ................................ 2012208974

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/326* (2013.01)

(58) Field of Classification Search

CPC .... G07F 17/32; G07F 17/326; G07F 17/3262; G07F 17/3272; G07F 17/3274; G07F 17/3276

See application file for complete search history.

(56) References Cited

U.S. PATENT DOCUMENTS

| | | | | |
|---|---|---|---|---|
| 5,564,700 A * | 10/1996 | Celona | G07F 17/3211 463/20 |
| 2003/0224852 A1* | 12/2003 | Walker | G07F 17/32 463/20 |
| 2006/0135243 A1* | 6/2006 | Englman | G07F 17/32 463/16 |
| 2006/0166735 A1 | 7/2006 | Steil et al. | |
| 2007/0213119 A1 | 9/2007 | Baerlocher et al. | |
| 2008/0039193 A1 | 2/2008 | Muir et al. | |

(Continued)

FOREIGN PATENT DOCUMENTS

| | | |
|---|---|---|
| CA | 2527367 | 5/2007 |
| CA | 2550438 | 6/2007 |

(Continued)

*Primary Examiner* — Kevin Y Kim

(74) *Attorney, Agent, or Firm* — McAndrews, Held & Malloy, Ltd.

(57) ABSTRACT

A method of gaming comprising conducting a play of a game for a player, wherein the game comprises a plurality of different game portions and conducting the play of the game comprises conducting at least one of the game portions, determining independently of play of the game whether to trigger a community game, determining upon triggering of the community game, whether the player has an active eligibility in respect of a conducted game portion; and determining, upon the player having an active eligibility, an award to apply in respect of at least one winning outcome of the community game based on at least the identity of the game portion in relation to which the player has an active eligibility.

29 Claims, 9 Drawing Sheets

(56) References Cited

U.S. PATENT DOCUMENTS

| | | | |
|---|---|---|---|
| 2008/0108428 A1 | 5/2008 | Thomas |
| 2009/0042641 A1 | 2/2009 | Anderson et al. |
| 2009/0069074 A1 | 3/2009 | Silvestro |
| 2009/0069075 A1 | 3/2009 | Silvestro |
| 2009/0069076 A1 | 3/2009 | Silvestro |
| 2009/0124363 A1 | 5/2009 | Baerlocher et al. |

FOREIGN PATENT DOCUMENTS

| | | |
|---|---|---|
| JP | 2006263481 | 10/2006 |
| MX | 9702820 | 2/1998 |
| SG | 137834 | 12/2007 |
| WO | 2006121663 | 11/2006 |
| WO | 2009061696 | 5/2009 |

* cited by examiner

GAMING SYSTEM AND A METHOD OF GAMING

RELATED APPLICATIONS

This application claims priority to Australia Patent Application No. 2012208974 having an International filing date of Jul. 27, 2012, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In some gaming systems, a player of an individual gaming machine can qualify to play a bonus game conducted by another gaming apparatus. For example, a particular gaming outcome may entitle the player to the bonus game.

In other gaming systems a plurality of players may qualify to play a bonus game where players compete against one another, with one or more players receiving an award based on their placing in the bonus game.

While such gaming systems provide players with enjoyment, a need exists for alternative gaming systems in order to maintain or increase player enjoyment.

BRIEF SUMMARY OF THE INVENTION

In a first aspect, the invention provides a method of gaming comprising:

conducting a play of a game for a player, wherein the game comprises a plurality of different game portions and conducting the play of the game comprises conducting at least one of the game portions;

determining independently of play of the game whether to trigger a community game;

determining upon triggering of the community game, whether the player has an active eligibility in respect of a conducted game portion; and determining, upon the player having an active eligibility, an award to apply in respect of at least one winning outcome of the community game based on at least the identity of the game portion in relation to which the player has an active eligibility.

In an embodiment, one of the different game portions is a base game portion which is conducted in each play of the game.

In an embodiment, one of the different game portions is a feature game portion conducted in addition to the base game portion in response to a feature trigger event occurring.

In an embodiment, there are a plurality of different feature game portions.

In an embodiment, one of the different game portions is a feature game choice portion.

In an embodiment, a feature game portion comprises generating a plurality of game outcomes.

In an embodiment, eligibility is defined by a timer defining a time within which the community trigger must occur.

In an embodiment, the timer is adjusted based on time rules associated with respective ones of the game portions.

In an embodiment, eligibility is defined by a time window defining a time within which the community trigger must occur.

In an embodiment, the time window is an active time window of one of a plurality of time windows associated with respective ones of the game portions.

In an embodiment, respective time windows are activated based on time rules associated with respective ones of the game portions.

In an embodiment, the award a player is eligible for is derived for each active wager from a fixed prize multiplied by a bet multiplier determined from a wager made in the base game portion, a multiplier dependent on size of an ante bet wagered in the base game portion.

In an embodiment, upon the eligibility being associated with a feature game portion, the fixed prize is also multiplied by a multiplier associated with the feature game portion In an embodiment, there are a plurality of players and the method comprises conducting an instance of the game for each player and determining eligibility for an award in the community game for each player based on the player's game instance.

In an embodiment, the method further comprises conducting the community game and determining whether to make an award to each eligible player.

In an embodiment, a player is entitled to have more than one active eligibility and the award is determined from each eligibility.

In a second aspect, the invention provides a gaming system comprising:

a plurality of gaming devices, each gaming device comprising a game controller arranged to conduct a play of a game for a player when the gaming device is active, wherein the game comprises a plurality of different game portions and conducting the play of the game comprises conducting at least one of the game portions; and a community game controller arranged to determine independently of play of the game whether to trigger a community game;

the gaming system arranged to:

determine upon triggering of the community game, whether each player has an active eligibility in respect of a conducted game portion; and determine, for each player having an active eligibility, an award to apply in respect of at least one winning outcome of the community game based on at least the identity of the game portion in relation to which the player has an active eligibility.

In an embodiment, the community game controller controls the community game.

In a third aspect, the invention provides a gaming system comprising:

means for conducting a play of a game for a player, wherein the game comprises a plurality of different game portions and conducting the play of the game comprises conducting at least one of the game portions;

means for determining independently of play of the game whether to trigger a community game;

means for determining upon triggering of the community game, whether the player has an active eligibility in respect of a conducted game portion; and means for determining, upon the player having an active eligibility, an award to apply in respect of at least one winning outcome of the community game based on at least the identity of the game portion in relation to which the player has an active eligibility.

In a fourth aspect, the invention provides a method of gaming comprising:

conducting a play of a game for a player, wherein the game comprises a plurality of different game portions having associated time windows and conducting the play of the game comprises conducting at least one of the game portions;

activating at least one time window in respect of each conducted game portion;

determining independently of play of the game whether to trigger a community game; and determining that a player is eligible to win an award from the community game upon an activated time window being open when the triggering occurs.

In an embodiment, one of the different game portions is a base game portion which is conducted in each play of the game.

In an embodiment, one of the different game portions is a feature game portion conducted in addition to the base game portion in response to a feature trigger event occurring.

In an embodiment, a condition of activating the time window is that the player has placed a qualifying wager for the play of the game.

In a fifth aspect, the invention provides a gaming system comprising:

a plurality of gaming devices, each gaming device comprising a game controller arranged to conduct a play of a game for a player when the gaming device is active, wherein the game comprises a plurality of different game portions having associated time windows and conducting the play of the game comprises conducting at least one of the game portions, each gaming device arranged to activate at least one time window in respect of each conducted game portion provided the player has placed a qualifying wager in respect of a base game portion of the game; and a community game controller arranged to determine independently of play of the game whether to trigger a community game;

the gaming system arranged to determine that a player is eligible to win an award from the community game upon an activated time window being open when the triggering occurs.

In a sixth aspect, the invention provides a gaming system comprising:

means for conducting a play of a game for a player, wherein the game comprises a plurality of different game portions having associated time windows and conducting the play of the game comprises conducting at least one of the game portions;

means for activating at least one time window in respect of each conducted game portion provided the player has placed a qualifying wager in respect of a base game portion of the game;

means for determining independently of play of the game whether to trigger a community game; and means for determining that a player is eligible to win an award from the community game upon an activated time window being open when the triggering occurs.

In a seventh aspect, the invention provides a method of gaming comprising:

conducting a play of a game for a player, wherein the game comprises a plurality of different game portions and conducting the play of the game comprises conducting at least one of the game portions by generating at least one game outcome having an associated time window activated by generation of each game outcome;

determining independently of play of the game whether to trigger a community game; and determining that a player is eligible to win an award from the community game upon an activated time window being open when the community game is triggered.

In an embodiment, one of the different game portions is a base game portion which is conducted in each play of the game.

In an embodiment, one of the different game portions is a feature game portion conducted in addition to the base game portion in response to a feature trigger event occurring.

In an embodiment, there are a plurality of different feature game portions.

In an embodiment, different numbers of game outcomes are generated in respect of different ones of the feature game portions.

In an eighth aspect, the invention provides a gaming system comprising:

a plurality of gaming devices, each gaming device comprising a game controller arranged to conduct a play of a game for a player, wherein the game comprises a plurality of different game portions and conducting the play of the game comprises conducting at least one of the game portions by generating at least one game outcome having an associated time window activated by generation of each game outcome; and a community game controller arranged to determine independently of play of the game whether to trigger a community game;

the gaming system arranged to determine that a player is eligible to win an award from the community game upon an activated time window being open when the triggering occurs.

In a ninth aspect, the invention provides a gaming system comprising:

means for conducting a play of a game for a player, wherein the game comprises a plurality of different game portions and conducting the play of the game comprises conducting at least one of the game portions by generating at least one game outcome having an associated time window activated by generation of each game outcome;

means for determining independently of play of the game whether to trigger a community game; and means for determining that a player is eligible to win an award from the community game upon an activated time window being open when the triggering occurs.

The invention also extends to computer program code which implements one or more of the above methods when executed, a computer readable medium or data signal comprising the program code, and transmitting the program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of Exemplary Gaming System

Figure 1:
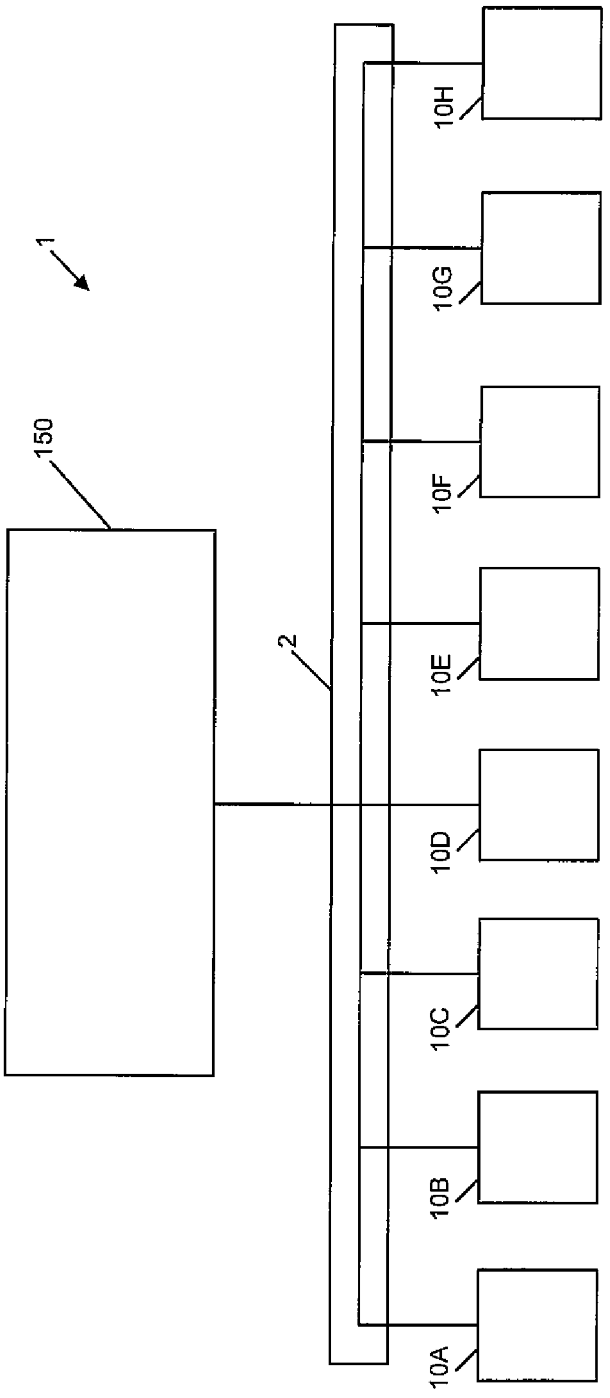
FIG. 1 is a block diagram of a gaming system with a community game controller.

FIG. 1 shows an exemplary gaming system 1 where a community game controller 150 is in data communication over a network 2, such as an Ethernet, with a bank of eight gaming devices in the form of standalone gaming machines 10. The community game controller 150 is arranged to trigger a community game and to communicate with the gaming devices to determine what award, if any, the game devices are eligible for in the triggered game. In one embodiment, each gaming device is arranged to conduct a game which has a plurality of different game portions including a base game portion and at least one feature portion. In one advantageous aspect, the award eligibility of respective ones of the plurality of gaming devices is based on the identity of the game portion in respect of which there is an active eligibility at the time of the trigger. In some embodiments the eligibilities are provided by time windows associated with respective ones of the plurality of game portions. In some embodiments, eligibility time windows are associated with generation of game outcomes, such as spins of a reel in spinning reel type game.

While, the community game controller 150 is shown in FIG. 1 as a separate entity to the gaming devices 10. In an alternative embodiment, it could be provided by one of the gaming devices incorporating a server module arranged to implement the community game controller in the manner described in Australian patent application 2008205413 filed 13 Aug. 2008.

Gaming Devices

Gaming devices capable of participating in the method of gaming of the embodiment can take any suitable form including stand alone gaming machines and server based gaming terminals.

Figure 2:
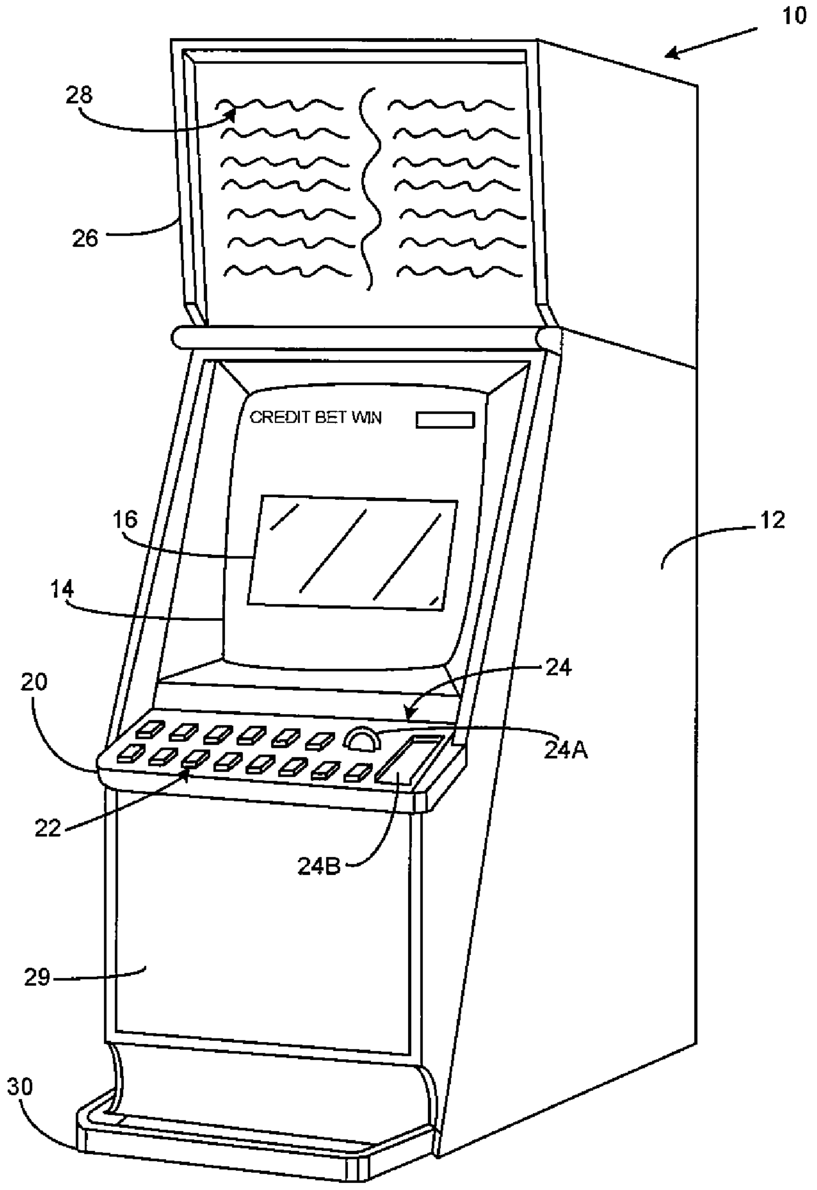
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
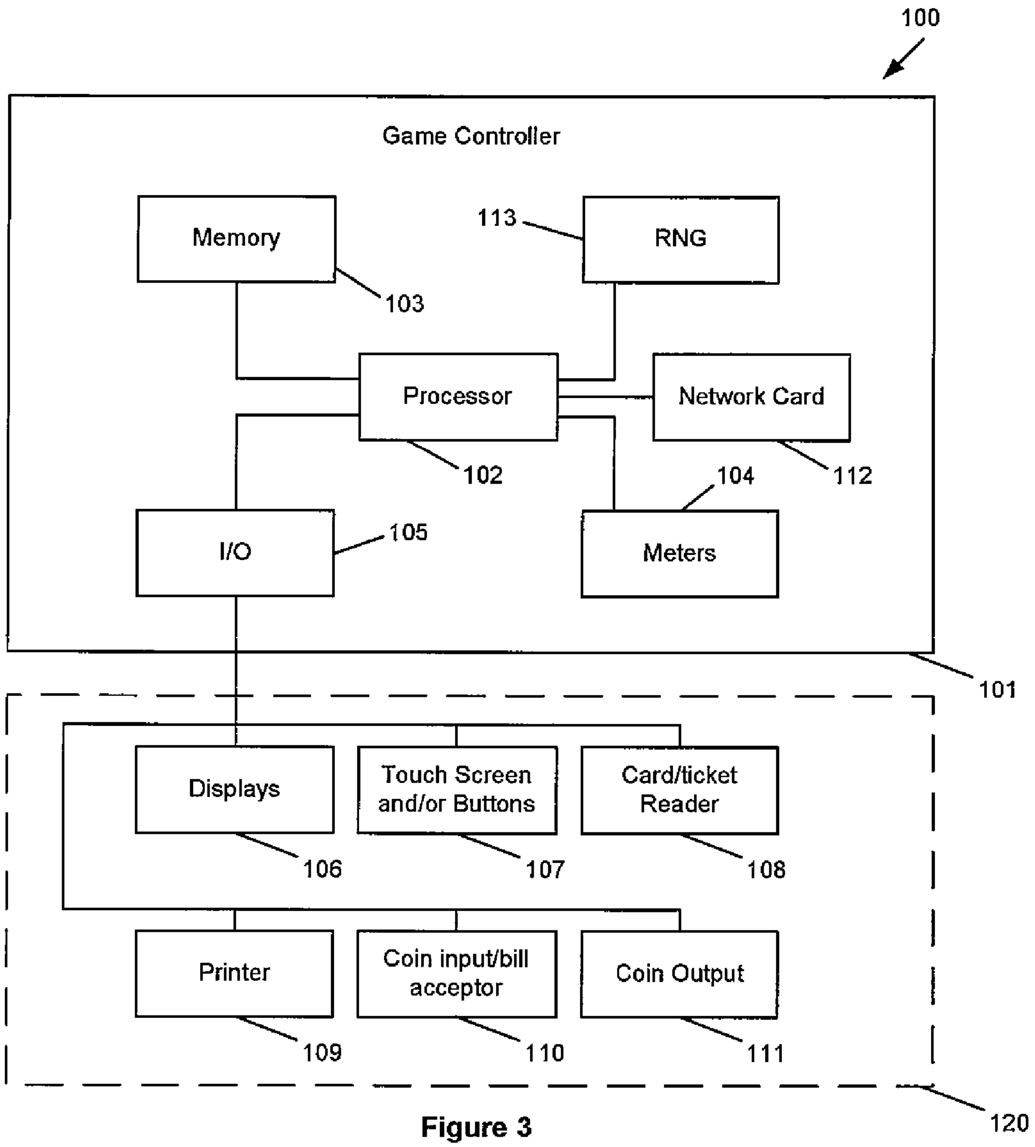
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
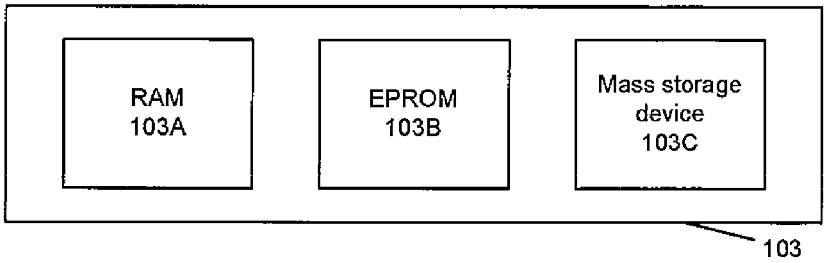
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a community game controller can be provided, for example, by a dedicated server in data communication with the game server.

Figure 5:
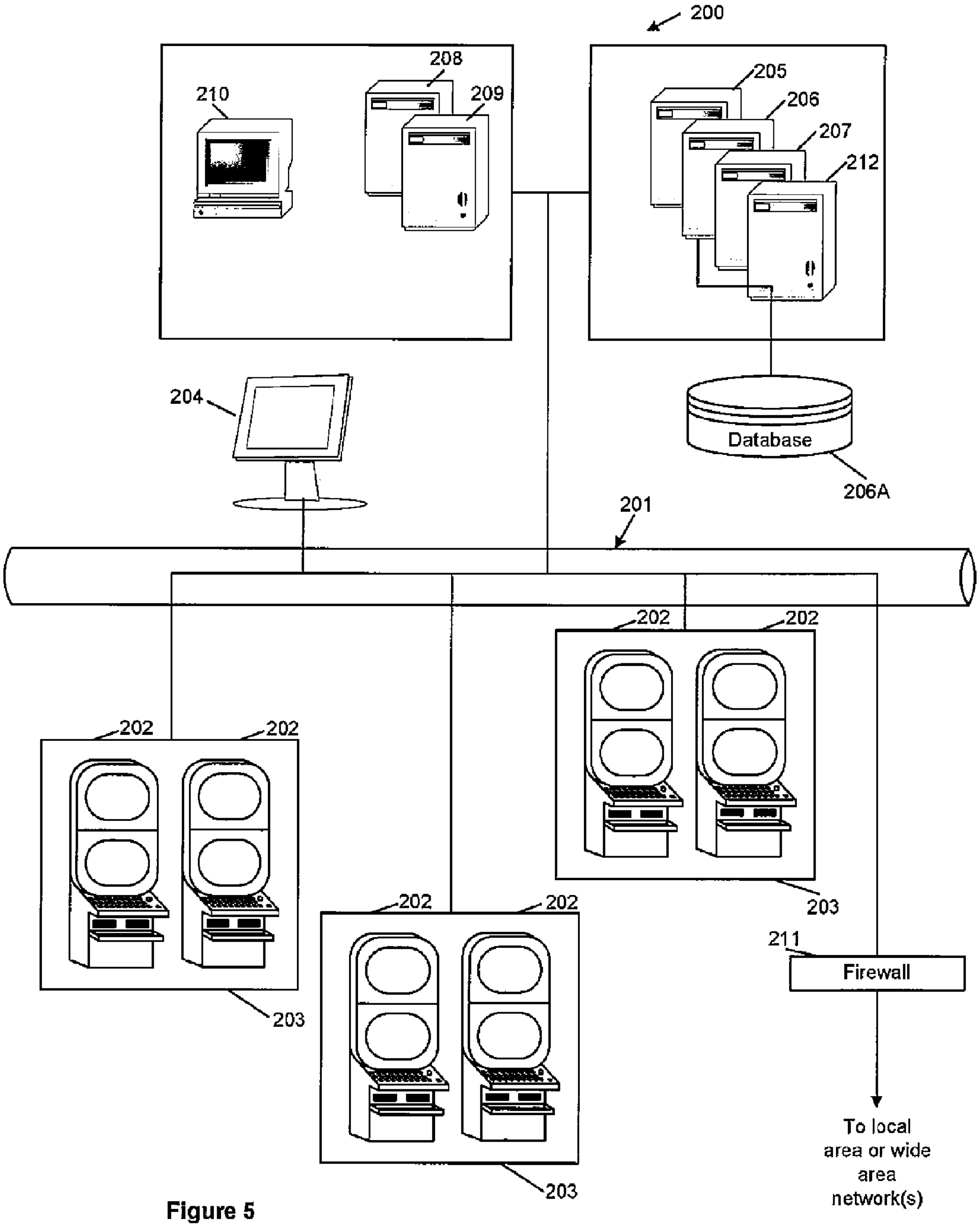
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A community game controller can be provided within such a network 200 by community game server 205, such that the community game server may implement a community game for a plurality of different banks of gaming machines rather than a specific controller being provide for each bank of gaming machines.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

As indicated above, in the embodiment, the community game is designed to be conducted so that all eligible gaming devices 10 may win an award. During play the gaming devices 10 activate eligibilities which expire after defined windows or can be extended (depending on the embodiment).

Figure 6:
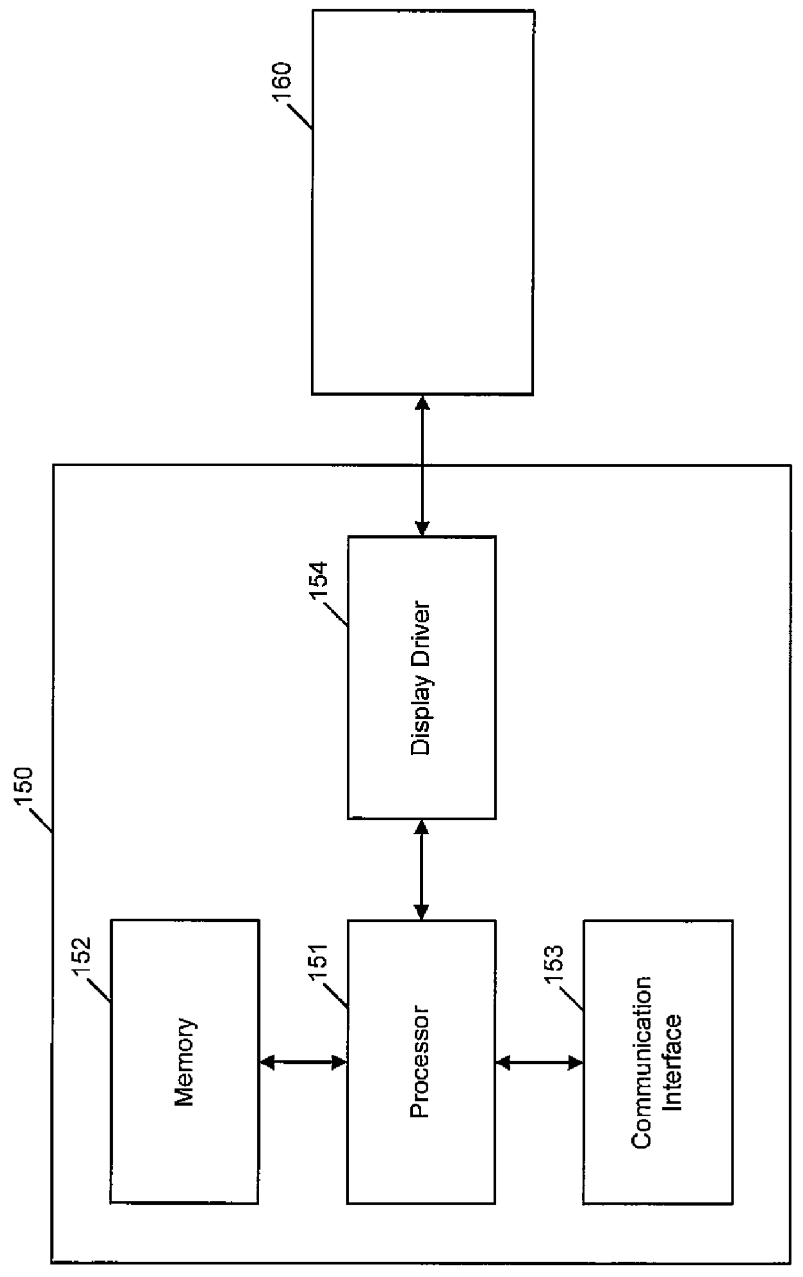
FIG. 6 is a block diagram of a community game controller.

Referring to FIG. 6, the constitution of the community game controller 150 is similar to that of the gaming device illustrated in relation to FIGS. 2 to 4 and 9 (below) in that it has a processor 151 arranged to implement the community game based on program code stored in memory 152 and a display driver 154 for driving the display 160 to show the community game outcomes. The community game controller 150 also includes a communication interface 153 which is designed to enable the processor 151 to communicate with each of the gaming devices 10.

Persons skilled in the art will appreciate the above components are the core components for implementing a community game but other components may be present in a community game controller. Persons skilled in the art will appreciate that the implementation of the community game controller is analogous to the implementation of community game controllers in existing gaming systems and reference may be made to such controllers for further details of implementation.

Figure 7:
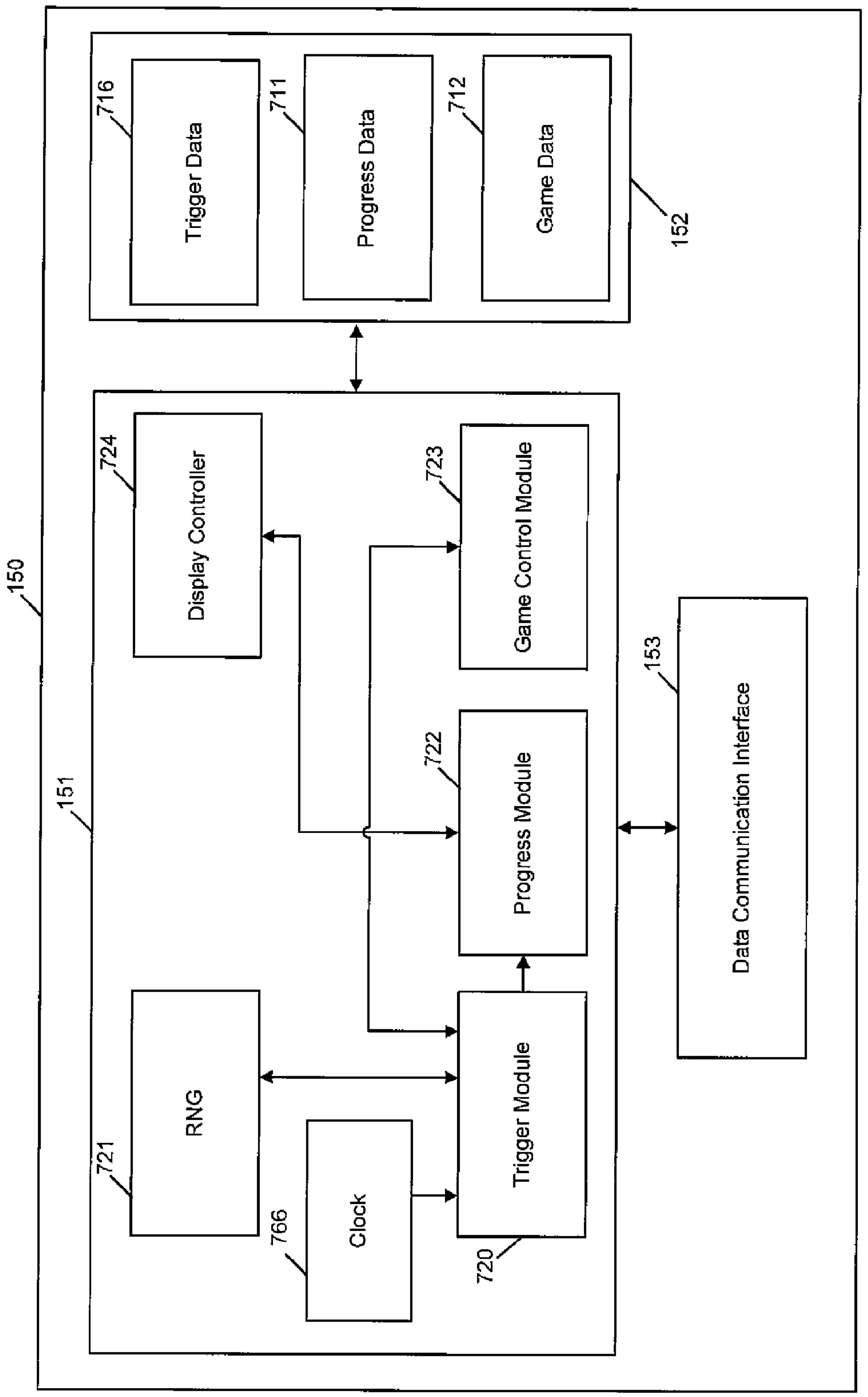
FIG. 7 is a functional block diagram of a community game controller.
Figure 9:
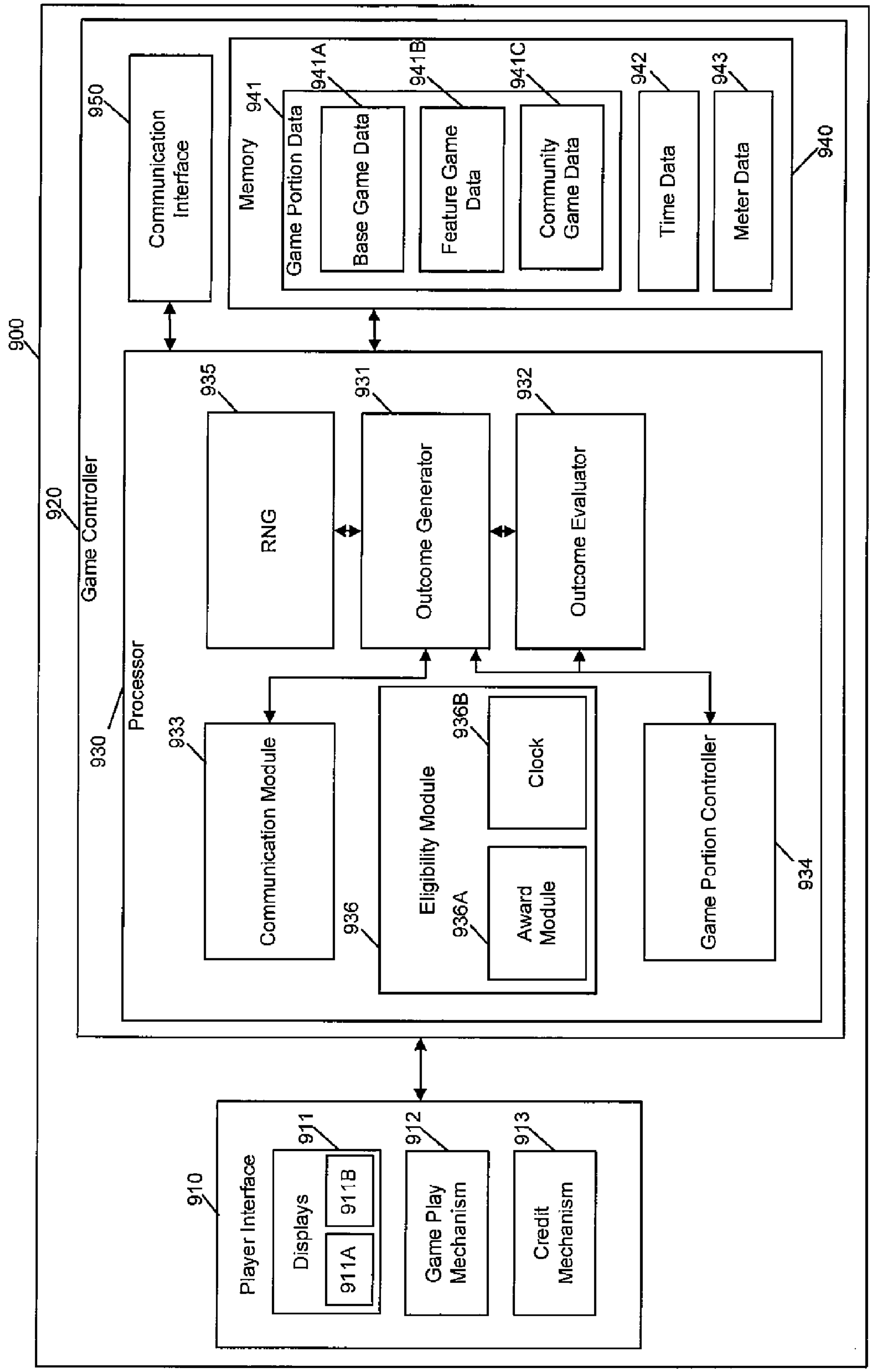
FIG. 9 is a functional block diagram of a gaming device in the form of a standalone gaming machine.

FIG. 7 is a functional block diagram of the community game controller 150 which shows that the processor 151 implements a number of modules in a similar manner to the processor of the gaming device shown in FIG. 9. The processor executes program code stored in memory 152 to instantiate a trigger module 720 which independently determines whether to trigger the community game, in this embodiment by repeatedly conducting random trials using random number generator 721 every designated time period by monitoring the clock 726, for example once a second. When a trigger occurs this is communicated via data communication interface 153 over the network to all the connected gaming devices 10.

FIG. 9 is a functional block diagram of one example of a gaming device in the form of a stand alone gaming machine. Each gaming device 900 has a communication interface 950 for receiving trigger data indicative of the community game being triggered from the community game controller 150 and communicating data in return as will be described in further detail below. The gaming device 900 may be the same or different to gaming machine 10,100 described above. In FIG. 9, the processor 930 of game controller 920 is shown implementing a number of modules based on program code and data stored in memory 940. Persons skilled in the art will appreciate that various of the modules could be implemented in some other way, for example by a dedicated circuit.

The gaming device 900 includes a player interface 910 has a pair of displays 911, display 911A displays game outcomes to a player while display 911B displays progress in a community game when one is being conducted. Gaming device 900 also has a game play mechanism 912 including input devices such as touch screen or buttons to enable the player to interact with the game by placing wagers and entering any other instructions required to play the game. Game play mechanism 912 also enables the player to interact with the game to learn game rules etc. The player interface 910 includes a credit mechanism 913 allowing the player to input credit into the gaming device 900 and/or be paid out any winnings or remaining credit. A person skilled in the art will appreciate that other components will be present in a gaming device 900 such as those described in relation to FIGS. 2 to 4 above. The memory 940 includes program code for implementing a game including game portion data 941 for implementing one or more portions of the game depending on how a specific play of the game progresses.

The processor 930 when executing the program code stored in memory 940 is arranged conduct a play of the game in response to the operation of the game play mechanism 912. In the embodiment, there are a fixed number of pay lines in the game, and the player operates a the game play mechanism to input a wager multiplier (the amount in credits be per line) of a set of available multipliers (e.g. 1,2,5,10) of a base bet (e.g. 1 credit per line) and the option to choose whether they wish to purchase eligibility for the community game by placing an ante bet. In the embodiment, the player selections include a plurality of different selections at different costs with different multipliers (e.g. 1,2,3) which affect the size of the potential award in the community feature game.

In each play of the game, a base game is conducted based on base game data 941A. Outcomes of the base game are generated with the outcome generator 931. The outcome evaluator 932 evaluates the game outcomes that are generated based on the wager specified with the game play mechanism 912 and updates meter data 942 as necessary. In the embodiment, at least one outcome of the base game result in further game portions being conducted if In this embodiment, the trigger occurring entitled the player to play one of a plurality of feature games stored as feature game data. Accordingly, the trigger results in a choice game portion where the player can review the available feature games and make a choice by operation of the game play mechanism 912. If the player doesn't make a choice, a default feature game is selected for the player. The feature game is then played. In this respect, game portion controller 934 receives the feature game selection and controls outcome generator 931 to generate an outcome or outcomes corresponding to the selected feature game and controls outcome evaluator 932 to evaluate the outcome or outcomes in accordance with the relevant rules.

In the embodiment, if the player has placed a qualifying wager, which in one embodiment may be an ante bet (other bets know in the art may be employed) time windows are opened to activate an eligibility, in the sense that a specific counter is initiated each time a game portion is initiated and the player is eligible until it expires. For example, a 5s window is opened when a base game is played, a 10s window is opened for the choice portion, a 30s window is opened for one feature game and in another feature game a 5s window is opened for each of a plurality of game outcomes. In the embodiment, awards in the form of award multipliers are associated with each of the game portions such that advantageously different awards can arise depending on the game portion or portions for which the player has an active eligibility. In one advantageous embodiment, a separate window is opened each time a relevant game portion is initiated so that a player may have several windows active at the same time. An advantage of this embodiment is that it allows for a clear identification of the relevant game portion(s) when the trigger occurs because of the associated window. In another embodiment, opening a window may close or cancel the previously opened windows. In an alternative embodiment, rather than employing windows, a timer may be activated with the base game portion and extended by other game portions occurring such as a feature game. In one embodiment, the player may place different qualifying bets which have associated different award multipliers.

Eligibility module 936 keeps track of a player's currently active eligibilities by starting counter for each time window (or time period) based upon time data 942 for each relevant game portion using clock 936B. An award sub-module keeps track of the player's current potential award or awards in the community game and updates display 911B to show the award which will apply if the community feature is triggered. There may be a number of different awards, e.g. for first, second and third place in the community game. The total award A is the sum of the awards (a) in respect of each eligibility. Each award, a is calculated by the formula:

$$a=CP*BM*CFM*GPM;$$

where CP is the relevant community game prize; BM is the bet multiplier; CFM is the purchased community feature multiplier; and GPM is the game portion multiplier 9 e.g. the feature game multiplier. It will be observed that if the player has not purchased a CFM or a gaming device is idle, a multiplier of 0 is applied such that while the gaming device participates in the community game, the prize award is zero such that the device is not eligible. persons skilled in the art will appreciate that rather than the awards being summed, the total multipliers can be summed and used to multiply the community game award(s)

When a community game trigger is received via communication module 933, the eligibility module freezes all current eligibilities and holds the current award as the award which may be won by the player. Game controller continues with play of the game until a point is reached (such as the end of the play) where the community game can be started. Any eligibilities accrued in this period are frozen by the eligibility module 936 for use after the community game. When the game controller 920 is ready for the community game, it advises the community game controller 150 via communication module 933 and communication interface 950. Community game control module 723 of community game controller 151 waits until each gaming device has indicated it is ready and then advises each gaming device to generate an outcome of the community game. In which respect, game portion controller controls outcome generator 931 to generate a game outcome using community game data 941C. Each gaming device communicates data indicative of the outcome to the community game controller. Progress module 722 determines the current placings of the gaming devices, stores them as progress data 711 and advises the gaming devices so that display 911B can be updated as well as display controller 724 so that community game display 160 can display the placings too. Game control module 723 then controls the gaming devices to conduct another game round. The process repeats until an end condition is reached as specified in community game data 712, such that one of the gaming devices has achieved a winning outcome, a time period has elapsed or a designated number of game rounds have been played.

Referring to FIG. 6 there is shown further detail of the community game controller 150. From FIG. 6 it will be apparent that community game controller 150 is in data communication with a communal display 160 on which the end game outcome is displayed to the players playing the bank of gaming machines 10 shown in FIG. 1. In the embodiment, individual game outcomes are displayed on a top box of the individual gaming machines 10 as described in further detail below.

In the above embodiment the base game conducted is a conventional spinning reel type game. In such embodiments, the evaluation entitlement may be based on how many lines are played in each game. Such win lines are typically formed by a combination of symbol display positions, one from each reel, the symbol display positions being located relative to one another such that they form a line.

In many games, the win entitlement is not strictly limited to the selected win lines for example, "scatter" pays are awarded independently of a player's selection of pay lines and are an inherent part of the evaluation entitlement.

Persons skilled in the art, will appreciate that in other embodiments, an evaluation entitlement may be based on a number of reels to play such as in games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 8:
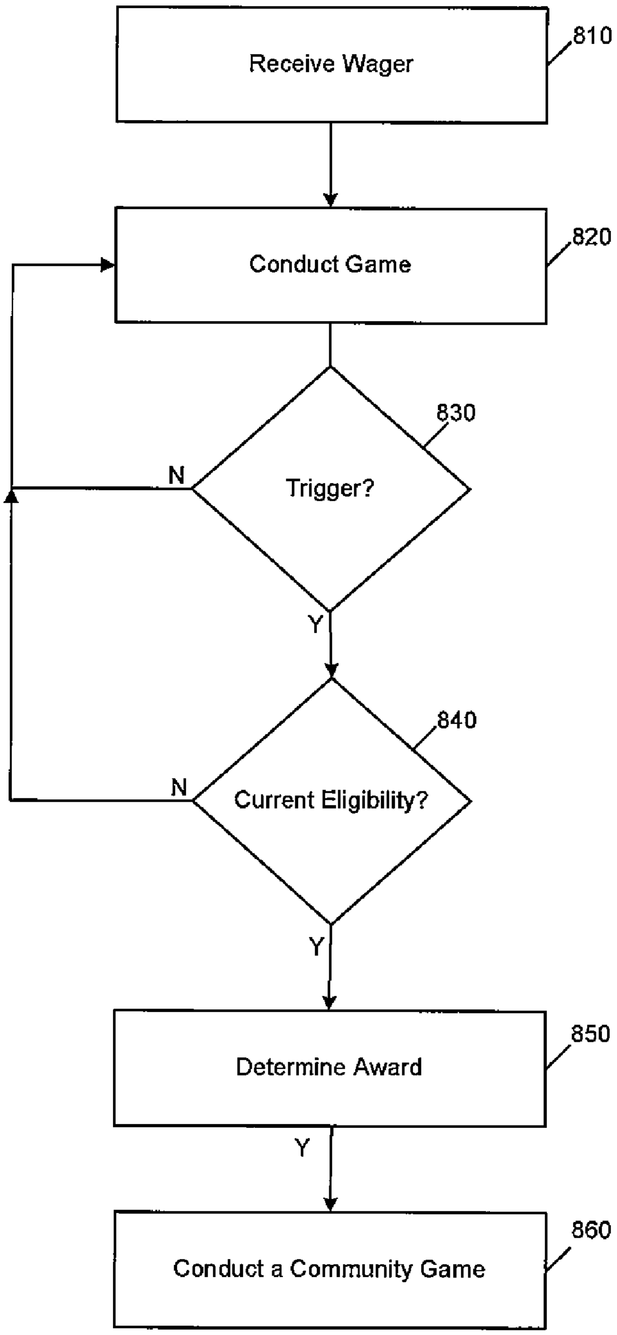
FIG. 8 is a flow chart of an embodiment.

The method of the embodiment is summarised in FIG. 8 which shows that the method involves receiving conducting 820 a game, determining 830 whether there is a trigger and then whether 840 the player has a current eligibility. When a player is eligible, the award which applies is determined (or a previously determined award is applied) and the community game is conducted so as to determine whether to make an award to the player.

Further aspects of the method will be apparent from the above description of the gaming system. Persons skilled in the art will also appreciate that the method could be embodied in program code. The program code could be supplied in a number of ways, for example on a computer readable medium, such as a disc or a memory or as a data signal (for example, by transmitting it from a server).

EXAMPLE

In the example, there are eight electronic gaming machines (EGMs) networked to one another where one of the gaming machines is the master EGM which implements a community game controller. The master EGM incorporates a server module arranged to implement the community game controller in the manner described in Australian patent application 2008205413 filed 13 Aug. 2008.

In the example, players play a game known as Lucky 88 independently on their machines until the Beijing Bonanza community game feature event is triggered randomly by the master EGM based on time (i.e. independent of game play).

All 8 machines participate in the Beijing Bonanza feature independent of their eligibility status. The Beijing Bonanza community feature operates is a race between the EGMs to collect the most symbols. Prizes are given to the EGMs that come first, second and third. The winning EGMs receive fixed prize amounts that have been multiplied by their eligibility status (and therefore if they are not eligible their prize will be 0).

Each EGM has two displays and there is also an overhead display for showing progress of the game. In the embodiment, it will not be possible for games to be played on any of the EGMs until the Master EGM has confirmed that exactly 8 machines are present and that each has a unique Machine ID in the range from 1 to 8.

The system disables itself not allowing any further game play on ANY of the 8 EGMs if:

The master EGM cannot be located/designated by one or more EGMs.

The existing master EGM cannot locate all 8 uniquely identified EGMs.

During the Beijing Bonanza feature the master EGM waits for all 8 EGMs to report their spin results before initiating the next spin (see further description below). If the master EGM does not receive a Beijing Bonanza spin result from one or more EGMs within a reasonable time frame the system must disable. Similarly, if an EGM does not receive the spin results or a lock up request from the master within a define time frame of initiating a spin during a Beijing Bonanza feature the system must disable.

Please refer to the technical specifications for full details.

In the example, players make two different bet selections in respect of a fixed number of win lines. The first selection is a bet multiplier [BET_M]; the fixed scorecard prizes for base game wins will be multiplied by the bet multiplier in the standard way. Wins from the Beijing Bonanza feature will also be multiplied by the bet multiplier as described in more detail below.

The second bet selection that players make determines their contribution to the Beijing Bonanza feature. There is a 40 credit, 50 credit and 60 credit option to choose from. The 40 credit option firstly buys a 30 credit game of Lucky 88. This is wager covers 25 paylines and 5 credit ante bet for eligibility for feature games to be triggered. This bet option also includes base-level eligibility to the Beijing Bonanza feature. The eligibility multiplier [ELIGIBILITY_M] will therefore be ×1 (times one).

The 50 credit option buys the same Lucky 88 30 credit game as above, but also includes double eligibility to the Beijing Bonanza feature. The eligibility multiplier [ELIGIBILTY_M] will therefore be ×2.

The 60 credit option buys the same standard Lucky 88 30 credit game as above, but also includes triple eligibility to the Beijing Bonanza feature. The eligibility multiplier [ELIGIBILITY_M] will therefore be ×3.

Figure 10:
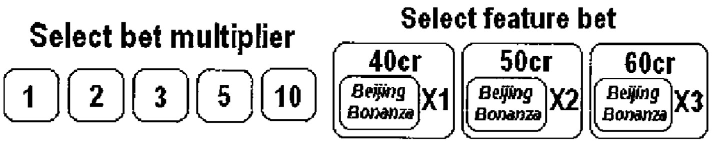
FIG. 10 shows an exemplary set of bet selections.

The bet selections will appear at the bottom of the game screen as shown in FIG. 10.

Beijing Bonanza Prize Display

Whenever a bet is placed and a game is initiated an ELIGIBILITY_PERIOD is awarded and commenced (i.e. a time window is opened). Additional ELIGIBILITY_PERIODs may also be awarded during the game. Associated with each ELIGIBILITY_PERIOD is a PRIZE_MULTIPLIER.

The PRIZE_MULTIPLIER applicable to an ELIGIBILITY_PERIOD is:

the current BET MULTIPLIER selected by the player, multiplied by the ELIGIBILITY_MULTIPLIER: 1, 2 or 3 for current feature bets 40, 50 or 60 respectively, and the FEATURE_MULTIPLIER (see Table 1) which applies to ELIGIBILITY_PERIODS associated with the feature game which are either free games of dice games).

ELIGIBILITY_PERIODs may overlap in time, either from previous games or from the current game. At any point in time the Beijing Bonanza prizes displayed on the top screen of an EGM are the basic prizes multiplied by the sum of all PRIZE_MULTIPLIERs for all ELIGIBILITY_PERIODs effective on that EGM at that time. These prizes are updated in real time and therefore the scorecard will be constantly changing.

In the example, Beijing Bonanza prizes for each ACTIVE BET are the amounts shown in Table 2 multiplied by the BET MULTIPLIER, the ELIGIBILTY MULTIPLIER and the FEATURE MULTIPLIER.

TABLE 2

| Feature Outcome | Prize (1 Credit) |
|---|---|
| 1st place | 5000 |
| 2nd place | 1000 |
| 3rd place | 400 |

When a player presses the PLAY button to commence a game, a base game ELIGIBILITY_PERIOD of [BASE_TIME] seconds will commence (see Table 1). Eligibility will be indicated and updated on the top right hand corner of the game screen as described in further detail below). The top screen will display an exploded Beijing Bonanza feature scorecard where the fixed prizes for first, second and third place will be multiplied out to show the prizes the player is currently available for and kept up to date in real time If a Lucky 88 base game feature is triggered either by the trigger combination spinning up on the reels, or by a mystery trigger, a game portion in the form of a feature choosing game portion is started and a feature selection screen is display displayed, a new feature selection ELIGIBILITY_PERIOD of [CHOICE_TIME] seconds will commence (overlapping with any remaining time from the original ELIGIBILITY_PERIOD—see Table 1). A timeout applies to the feature selection such that if the feature selection ELIGIBILITY_PERIOD expires the default feature selection (15 free games) will be made as if the player had made the selection by touching the screen.

That is, if the Lucky 88 Feature is triggered, that base bet will open an additional 20 second window while the player makes a feature selection. The feature selection will then open further windows of time with relevant multipliers according to the following Table 3. The time shown in the table applies to each game outcome whether it be a spin of the reels (free games) or each dice game (including hold/re-spins).

TABLE 3

| FEATURE SELECTION | TIME PER GAME OUTCOME/SPIN (SECS) | FEATURE MULTIPLIER |
|---|---|---|
| 25 free games | 12.28 | 1 |
| 15 free games | 11.21 | 2 |
| 8 free games | 11.14 | 4 |
| 4 free games | 11.51 | 8 |
| 3 dice games | 35.19 | 3 |

The Lucky 88 Feature is triggered by 3 or more scattered [LANTERN]. The feature can also be triggered randomly at the end of any spin of the reels. If no choice is made within 20 seconds the [GREEN] 15 free games feature will be automatically selected.

| | |
|---|---|
| [BLUE] | 25 free games - If one or more MAN substitutes in a win the pay for that win is multiplied by 5 or 18. |
| [GREEN] | 15 free games - If one or more MAN substitutes in a win the pay for that win is multiplied by 8 or 38. |
| [YELLOW] | 8 free games - If one or more MAN substitutes in a win the pay for that win is multiplied by 18 or 88. |
| [RED] | 4 free games - If one or more MAN substitutes in a win the pay for that win is multiplied by 88. |
| [WHITE] | Dice feature (see below). |

Lucky 88—Dice Feature 3 dice games are awarded. Each dice game starts with the 8 outer dice being rolled. If one or more [8] is rolled then all of the [8]'s are held and the remaining outer dice are rolled again. This continues until no more [8]'s are rolled or 8[8]'s appear. At the end of each dice game a prize is awarded for the number of [8]'s spun up as shown in Table 4.

TABLE 4

| Result | Prize (1 credit) |
|---|---|
| 8 × [8]: | 10888 |
| 7 × [8]: | 2088 |
| 6 × [8]: | 888 |
| 5 × [8]: | 488 |
| 4 × [8]: | 288 |
| 3 × [8]: | 188 |
| 2 × [8]: | 88 |
| 1 × [8]: | 48 |

Prizes are multiplied by the bet multiplier on the game that triggered the feature as shown on the screen. At the completion of any 3 dice games the middle die is rolled and if "3 more games" is rolled another 3 dice games are played.

When the feature selection is made (either by the player or by timeout default), another overlapping ELIGIBILITY_PERIOD of [FEATURE_TIME] [x] seconds will commence during which a FEATURE_MULTIPLIER will be applied to the Beijing Bonanza PRIZE_MULTIPLIER (see Table 1).

For every free game or dice game that commences (including free game re-trigger games), another overlapping ELIGIBILITY_PERIOD with FEATURE_MULTIPLIER will commence. Note: one dice game includes all holds and re-spins that occur when "8" symbols are spun up.

The full Lucky 88 feature cannot be re-triggered (i.e. the player cannot make another selection of a feature). If a trigger occurs during a free game series then only the same free game series will be re-triggered. Hence, the number of free games remaining will increment by the number of free games that applied to the initial feature selection. Substitute win multiplier weightings will remain the same for all of the free games.

An EGM will be eligible to win Beijing Bonanza prizes whenever one or more ELIGIBILITY_PERIODs are active. There will be an eligibility icon displayed in the top right hand corner of the game screen at all times.

While no ELIGIBILITY_PERIODs are active the eligibility icon will remain in a "NOT ELIGIBLE" state indicating that the player is not eligible to win the Beijing Bonanza feature prizes. The prizes displayed on the top screen for the Beijing Bonanza feature will be 0 (i.e. the basic prizes multiplied by the sum of the PRIZE_MULTIPLIERS which will be 0). A transparent banner with the words "NOT ELIGIBLE" is displayed over the top screen display.

Whenever one or more ELIGIBILITY_PERIODs are active, the eligibility icon on the top right hand corner of the game screen will change to its eligible state (if not already active). The Beijing Bonanza prizes on the top screen will be displayed and updated in real time.

Whenever the longest time that remains in any of the active ELIGIBILITY_PERIODs reaches 5 seconds, the active eligibility icon will begin to flash slowly on and off until either the time remaining in that ELIGIBILITY_PERIOD reaches 2 seconds, or Another ELIGIBILITY_PERIOD of more than 5 seconds commences.

Whenever the longest time that remains in any of the active ELIGIBILITY_PERIODs reaches 2 seconds, the active eligibility icon will flash more quickly, a transparent banner will appear over the game screen with the message "Beijing Bonanza feature eligibility lapsing!", and an alarm sound will play until either that ELIGIBILITY_PERIOD expires, or another ELIGIBILITY_PERIOD of more than 5 seconds commences.

Whenever all of the ELIGIBILITY_PERIODs expire the eligibility icon will revert to its "not eligible" state.

Beijing Bonanza Feature Trigger

The master EGM will continuously test for a Beijing Bonanza feature trigger condition. This calculation is performed regardless of whether any or all of the 8 EGMs are being played. For every second of real time that elapses there must be a probability of [TRIGGER_PROB] that a Beijing Bonanza feature is triggered (see Table 1). The master EGM continually checks the status of the clock to ensure that a random determination is made for every elapsed second. If for any reason the number of selections cannot match the elapsed number of seconds then the whole system including all 8 EGMs disables.

When the master EGM determines that a Beijing Bonanza feature has been triggered, it immediately stops performing trigger calculations. At the same time, it notifies all connected EGMs to temporarily freeze all active ELIGIBILTY_PERIODs until after the Beijing Bonanza feature has occurred. New ELIGIBILITY_PERIODs may still be allocated during the current games being played—for example during a free games feature. However, these ELIGIBILITY_PERIODs are frozen along with the others so that they do not yet start to decrement. Immediately after completion of the Beijing Bonanza feature, the master will recommence trigger calculations and at the same time will notify all EGMs to start up their existing ELIGIBILITY_PERIODs again (and update the display of their eligibility icons accordingly).

If a Beijing Bonanza feature is triggered while none of the EGMs are eligible then the feature event will still operate as described below. This will serve as an attract mode to encourage people to start playing the machines.

If a Beijing Bonanza feature is triggered by the master, it must immediately notify all 8 EGMs. The EGMs then:

- Immediately display the transparent "Beijing Bonanza!" banner over the current game screen for 5 seconds;
- Display a top screen animation and Beijing Bonanza feature display with prizes fixed at the values they were at when the trigger occurred (if the prizes are zero due to being ineligible, also display the "Not Eligible" watermark over the screen);
- Complete any current Lucky 88 game but not allow any further games to be initiated.

When the current game completes display the "Beijing Bonanza!" banner until the feature event commences;

- Freeze the eligibility icon on the top right hand corner of the screen in the same active or inactive state as it was when the trigger occurred;
- Inform the master of its ready status; and
- Wait for the master to initiate the Beijing Bonanza feature event.

After triggering the Beijing Bonanza feature the master waits for a ready status from all 8 EGMs before commencing the feature. If a ready status is not received by all 8 EGMs within a defined time frame the system disables. Once all 8 EGMs have reported a ready status the master must commence the Beijing Bonanza feature.

Beijing Bonanza Community Feature Game

When the master commences the Beijing Bonanza feature event, the community display and the top screens of the EGMs will first play a synchronised feature animation to signal the start of the feature. The EGMs will also display a Beijing Bonanza banner over the game screens, which will change to display the special feature reel strips in start up position. The message "Beijing Bonanza Now Playing!" will appear.

After completion of the animation sequence, the EGM top screens will each display a feature pyramid of display positions which can be filled by selected symbols during the community game with all of the positions in the empty state. The prize values that the EGMs are playing for will be displayed to one side of the pyramid, and a list of each of the EGMs the positions that they are in will appear on the other side of the pyramid. Note that the prize values displayed for each EGM may be different in accordance with the various PRIZE_MULTIPLIERs that were applicable to that EGM at the time that the feature was triggered, and the prizes will remain fixed at the trigger values for the duration of the feature. The status list will initially display each of the 8 different EGMs in the position of 1$^{s}$t, and the positions for each EGM will update after each reel spin during the feature event with "1$^{st}$", "2$^{nd}$" and "3$^{rd}$" emphasized. The order of EGMs on the display will be re-arranged when they are updated so that all of the "1$^{st}$" positions appear at the top followed by the "2$^{nd}$" positions etc.

When the Beijing Bonanza feature commences a new set of reels will be displayed containing only [GOLD NUGGET] symbols. Free games will commence at the same time on all 8 Beijing Bonanza machines. During the free games every [GOLD NUGGET] that a player spin's up fills in one of the positions in the pyramid on your top screen.

For each EGM the place that belongs to that EGM will appear larger than the others in the status list and the message "You are coming XYZ!" will be continuously updated on the top screen and rotating on the message line of the game screen. Initially all EGMs will be shown to be coming 1st and the message will therefore read "You are coming 1st!".

For the duration of the race portion of the feature, the overhead a display will show a status list of the different EGMs.

When the initial animation sequences have completed, the master EGM will inform the EGMs to play their first reel spin. Each EGM will randomly select positions from the special feature reels and automatically spin the reels to reveal the relevant outcomes. As soon as the reels start spinning the "Beijing Bonanza Feature!" message will become "Beijing Bonanza Feature Game #1" and will increment at the start of each reel spin until the feature completes.

At the end of the first reel spin, the EGM will determine how many gold nuggets appear in the game window and will add that many gold nuggets onto the top screen starting by filling display positions from the base of the pyramid. The EGMs will then inform the master that their game outcome has been generated and the number of nuggets that were revealed. When the master has received this information from all 8 EGMs it will determine the total number of nuggets that each EGM has revealed so far and will then inform the EGMs and the overhead plasma display of the position that each one is coming. The EGMs will then update the status list and message on the top screen and game screen respectively and the process will repeat starting with another reel spin on each EGM.

This process will continue to repeat until one or more of the EGMs completes their pyramid at which point they will inform the master that they have won. The master will then inform all EGMs of the updated status for each EGM and that the feature has completed.

The overhead plasma display will commence a feature win sequence advertising the EGMs that came first second and third. The winning EGMs award the relevant win amounts to their credit meters according to their top box scorecards. They will also display a win animation on the top screen as well as a celebratory animation over the game screen with win tune applicable to the size of the Beijing Bonanza win. After the win sequence the top screen and game screen will revert to their standard state and the message "Beijing Bonanza Feature Completed" will be displayed.

If at any time during the Beijing Bonanza feature the information that the master receives from any or all of the EGMs does not reconcile with the feature status held by the master then the entire system disables.

TABLE 1

| Variable | Value |
|---|---|
| [BASE_TIME] | 10 |
| [CHOICE_TIME] | 20 |
| [FEATURE_TIME][25FreeGames] | 12.28 |
| [FEATURE_TIME][15FreeGames] | 11.21 |
| [FEATURE_TIME][8FreeGames] | 11.14 |
| [FEATURE_TIME][4FreeGames] | 11.5099756355843 |
| [FEATURE_TIME][3DiceGames] | 35.1851851851852 |
| FEATURE_MULTIPLIER [25FreeGames] | 1 |
| FEATURE_MULTIPLIER [15FreeGames] | 2 |
| FEATURE_MULTIPLIER [8FreeGames] | 4 |
| FEATURE_MULTIPLIER [4FreeGames] | 8 |
| FEATURE_MULTIPLIER [3DiceGames] | 3 |
| [TRIGGER_PROB] | 0.000737450890609835 |

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with a plurality of gaming machines that are in data communication with a community game controller, each gaming machine including a player interface and a game controller, the player interface having a credit input mechanism configured to accept an item associated with a monetary value for establishing a credit balance, the credit balance being increasable and decreasable based at least on wagering activity, comprising:

conducting a play of a first game for a respective player at one of said gaming machines, wherein the first game comprises a plurality of different game portions and conducting the play of the first game comprises conducting at least one of the game portions, wherein respective time windows are associated with at least some of the game portions and are activated when a respective game portion is conducted, and wherein at least some of the time windows have different durations from one another;

via the community game controller, determining independently of play of the first game, whether to trigger a community game;

determining, upon triggering of the community game, whether the player has a time window active in respect of a conducted game portion of the first game; and determining, upon the player having an active time window, an award to apply in respect of at least one winning outcome of the community game based on at least the identity of the game portion of the first game in relation to which the player has an active time.

2. A method as claimed in claim 1, wherein one of the different game portions of the first game is a base game portion which is conducted in each play of the first game.

3. A method as claimed in claim 2, wherein one of the different game portions is a feature game portion conducted in addition to the base game portion in response to a feature trigger event occurring.

4. A method as claimed in claim 3, wherein there are a plurality of different feature game portions.

5. A method as claimed in claim 4, wherein one of the different game portions is a feature game choice portion.

6. A method as claimed in claim 3, wherein a feature game portion comprises generating a plurality of game outcomes.

7. A method as claimed in claim 3, wherein the award a player is eligible for is derived for each active wager from a fixed prize multiplied by a bet multiplier determined from a wager made in the base game portion, a multiplier dependent on size of an ante bet wagered in the base game portion.

8. A method as claimed in claim 7, wherein upon an active time window being associated with a feature game portion, the fixed prize is also multiplied by a multiplier associated with the feature game portion.

9. A method as claimed in claim 1, wherein there are a plurality of players and the method comprises conducting an instance of the first game for each player and, for each player of the first game (1) determining, upon triggering of the community game, whether the respective player has a time window active in respect of a conducted game portion of the first game and (2) determining, upon the respective player having an active time window, an award to apply in respect of at least one winning outcome of the community game based on at least the identity of the game portion of the first game in relation to which the respective player has an active time window.

10. A method as claimed in claim 1 further comprising conducting the community game and determining whether to make an award to each eligible player.

11. A method as claimed in claim 1, wherein a player is entitled to have more than one time window active and the award is determined from each active time window.

12. A method as claimed in claim 1, further comprising executing computer program code.

13. A method as claimed in claim 12, further comprising storing said computer program code in a computer readable medium.

14. A method as claimed in claim 12, further comprising transmitting the computer program code.

15. A method as claimed in claim 12, further comprising generating data signal comprising the computer program code.

16. A method as claimed in claim 1, wherein the respective time windows are activated based on time rules associated with respective ones of the game portions.

17. A gaming system comprising:

a plurality of gaming devices, each gaming device comprising a player interface and a game controller, the player interface having a credit input mechanism configured to accept an item associated with a monetary value for establishing a credit balance, the credit balance being increasable and decreasable based at least on wagering activity, the game controller arranged to conduct a play of a game for a player when the gaming device is active, wherein the game comprises a plurality of different game portions, wherein conducting the play of the game comprises conducting at least one of the game portions, wherein respective time windows are associated with at least some of the game portions and are activated when a respective game portion is conducted, and wherein at least some of the time windows have different durations from one another; and a community game controller in data communication with each of the gaming devices and being arranged to determine independently of play of the game and independently of player input whether to trigger a community game;

the gaming system arranged to:

determine, upon triggering of the community game, whether each player has a time window active in respect of a conducted game portion of the first game; and determine, for each player having an active time window, an award to apply in respect of at least one winning outcome of the community game based on at least the identity of the game portion in relation to which the player has an active time window.

18. A gaming system as claimed in claim 17, wherein the community game controller controls the community game and is arranged to (i) determine, upon triggering of the community game, whether each player has a time window active in respect of a conducted game portion; and (ii) determine, for each player having an active time window, an award to apply in respect of at least one winning outcome of the community game based on at least the identity of the game portion in relation to which the player has an active time window.

19. A method of gaming for use with a plurality of gaming machines that are in data communication with a community game controller, each gaming machine including a player interface and a game controller, the player interface having a credit input mechanism configured to accept an item associated with a monetary value for establishing a credit balance, the credit balance being increasable and decreasable based at least on wagering activity comprising:

conducting a play of a first game for a player at one of said gaming machines, wherein the first game comprises a plurality of different game portions having associated time windows and conducting the play of the first game comprises conducting at least one of the game portions, wherein at least some of the time windows have different durations from one another;

activating, via the gaming machine, at least one time window in respect of each conducted game portion;

via the community controller, determining independently of play of the first game whether to trigger a community game; and determining that a player is eligible to win an award from the community game upon an activated time window from the first game being open when the community game is triggered.

20. A method as claimed in claim 19, wherein one of the different game portions is a base game portion which is conducted in each play of the game.

21. A method as claimed in claim 20, wherein one of the different game portions is a feature game portion conducted in addition to the base game portion in response to a feature trigger event occurring.

22. A method as claimed in claim 19, wherein a condition of activating the time window is that the player has placed a qualifying wager for the play of the game.

23. A gaming system comprising:

a plurality of gaming devices, each gaming device comprising a player interface and a game controller, the player interface having a credit input mechanism configured to accept an item associated with a monetary value for establishing a credit balance, the credit balance being increasable and decreasable based at least on wagering activity, the game controller arranged to conduct a play of a first game for a player when the gaming device is active, wherein the first game comprises a plurality of different game portions having associated time windows and conducting the play of the first game comprises conducting at least one of the game portions, wherein at least some of the time windows have different durations from one another, and wherein each gaming device is arranged to activate at least one time window in respect of each conducted game portion provided the player has placed a qualifying wager in respect of a base game portion of the game; and a community game controller in data communication with the gaming devices and being arranged to determine independently of play of the first game whether to trigger a community game;

the gaming system arranged to determine that a player is eligible to win an award from the community game upon an activated time window from the first game being open when the community game is triggered.

24. A method of gaming for use with a plurality of gaming machines that are in data communication with a community game controller, each gaming machine including a player interface and a game controller, the player interface having a credit input mechanism configured to accept an item associated with a monetary value for establishing a credit balance, the credit balance being increasable and decreasable based at least on wagering activity comprising:

conducting a play of a first game for a player at one of said gaming machines, wherein the first game comprises a plurality of different game portions, and conducting the play of the first game comprises conducting at least one of the game portions by generating at least one game outcome having an associated time window activated by generation of each game outcome, wherein at least some of the associated time windows have different durations from one another;

via the community controller, determining independently of play of the first game whether to trigger a community game; and determining that a player is eligible to win an award from the community game upon an activated time window from the first game being open when the community game is triggered.

25. A method as claimed in claim 24, wherein one of the different game portions is a base game portion which is conducted in each play of the game.

26. A method as claimed in claim 25, wherein one of the different game portions is a feature game portion conducted in addition to the base game portion in response to a feature trigger event occurring.

27. A method as claimed in claim 26, wherein there are a plurality of different feature game portions.

28. A method as claimed in claim 27, wherein different numbers of game outcomes are generated in respect of different ones of the feature game portions.

29. A gaming system comprising:

a plurality of gaming devices, each gaming device comprising a player interface and a game controller, the player interface having a credit input mechanism configured to accept an item associated with a monetary value for establishing a credit balance, the credit balance being increasable and decreasable based at least on wagering activity, the game controller arranged to conduct a play of a first game for a player, wherein the first game comprises a plurality of different game portions, wherein at least some of the game portions having outcomes that activate associated time windows, wherein at least some of the time windows have different durations from one another, and wherein conducting the play of the first game comprises conducting at least one of the game portions by generating at least one game outcome; and a community game controller in data communication with the gaming devices and arranged to determine independently of play of the first game whether to trigger a community game;

the gaming system arranged to determine that a player is eligible to win an award from the community game upon an activated time window from the first game being open when the community game is triggered.

* * * * *